United States Patent
Ding et al.

(10) Patent No.: US 10,200,091 B2
(45) Date of Patent: Feb. 5, 2019

(54) RF FRONT END MODULE AND NEAR FIELD COMMUNICATION DEVICE

(71) Applicant: NXP B.V., Eindhoven (NL)

(72) Inventors: Jingfeng Ding, Gratkorn (AT); Gernot Hueber, Gratkorn (AT); Ian Thomas Macnamara, Gratkorn (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/621,286

(22) Filed: Jun. 13, 2017

(65) Prior Publication Data

US 2018/0359005 A1    Dec. 13, 2018

(51) Int. Cl.
   *H04B 5/00*    (2006.01)
   *H04W 88/06*    (2009.01)

(52) U.S. Cl.
   CPC ......... *H04B 5/0075* (2013.01); *H04B 5/0031* (2013.01); *H04W 88/06* (2013.01)

(58) Field of Classification Search
   CPC .... H04B 5/0075; H04B 5/0031; H04W 88/06
   USPC ............................................. 455/41.1, 41.2
   See application file for complete search history.

(56) References Cited

U.S. PATENT DOCUMENTS

| | | | |
|---|---|---|---|
| 8,818,297 B2 | 8/2014 | Merlin | |
| 9,390,360 B1* | 7/2016 | Yang | G06K 19/0727 |
| 9,401,739 B2* | 7/2016 | Pieber | H04B 1/44 |
| 9,408,015 B2 | 8/2016 | Khorram et al. | |
| 9,930,725 B2 | 3/2018 | Mow et al. | |

| | | | |
|---|---|---|---|
| 2005/0206471 A1* | 9/2005 | Khorram | H03H 7/38 333/25 |
| 2008/0246411 A1* | 10/2008 | Yang | H02M 3/335 315/247 |
| 2009/0195324 A1* | 8/2009 | Li | H01F 19/04 333/25 |

(Continued)

FOREIGN PATENT DOCUMENTS

| | | |
|---|---|---|
| CN | 105446127 A | 3/2016 |
| GB | 2 243 038 A | 10/1991 |

(Continued)

OTHER PUBLICATIONS

Extended European Search Report for Patent Appln. No. 18175217.1 (dated Nov. 8, 2018).

(Continued)

*Primary Examiner* — Edward Urban
*Assistant Examiner* — Max Mathew

(57) ABSTRACT

A device for inductively coupled communications includes an NFC module for generating an electromagnetic carrier signal and modulating the carrier signal according to data to be transmitted, and an antenna circuit coupled to and driven by said NFC module with the modulated carrier signal. The device includes an RF front end coupled between said NFC module and said antenna circuit. The RF front end includes a balanced to unbalanced (Balun) transformer and a tuning capacitor. The Balun transformer has a first winding coupled to said NFC module via differential transmitter terminals of said NFC module and a second winding coupled to said tuning capacitor. A first terminal of said tuning capacitor is coupled to a receiving terminal of said NFC module. The Balun transformer and tuning capacitor provide a function of an electromagnetic compatibility (EMC) filter.

20 Claims, 5 Drawing Sheets

(56) References Cited

U.S. PATENT DOCUMENTS

| | | | |
|---|---|---|---|
| 2013/0009704 A1* | 1/2013 | Liao | H04B 1/52 330/253 |
| 2014/0018017 A1* | 1/2014 | Merlin | G06K 19/07749 455/90.1 |
| 2015/0249485 A1 | 9/2015 | Ouyang et al. | |
| 2016/0028446 A1 | 1/2016 | Moon et al. | |
| 2017/0019783 A1* | 1/2017 | Van Bosch | H04W 12/06 |
| 2017/0288795 A1* | 10/2017 | Ding | H04B 17/318 |

FOREIGN PATENT DOCUMENTS

| | | |
|---|---|---|
| KR | 20120103297 A | 9/2012 |
| WO | 2009/116001 A1 | 9/2009 |

OTHER PUBLICATIONS

Office action for related U.S. Appl. No. 15/950,835 (dated Nov. 15, 2018).

\* cited by examiner

RF FRONT END MODULE AND NEAR FIELD COMMUNICATION DEVICE

The present disclosure generally relates to an inductively coupled communication system, and more specifically, to a near field communication (NFC) device and an RF front end of said NFC device.

FIG. 1 depicts an example inductively coupled communication system. Communication system 100 may include a first communication device 102 and a second communication device 104. Communication device 102 and communication device 104 communicate with each other using inductively coupled communication. For example, the inductively coupled communication may be NFC. Examples of communication devices include wireless communication devices, cellular phones, smartphones, tablet devices, voice recorders, digital cameras, still cameras, camcorders, gaming systems, laptop computers, etc.

In inductively coupled communication, the first device 102 may generate an electromagnetic field to which the second device 104 may be coupled. For example, in the case of NFC, the direction for the data flow may be characterized by having the first device 102 (also referred to as a polling device, proximity coupling device (PCD), reader or initiator) provide the electromagnetic field. The second device 104 (also referred to as a listener, listening device, proximity integrated circuit card (PICC), tag or target) may communicate with the first device 102 by generating modulation content.

As depicted in FIG. 1, the first device 102 may include a transmitter 103 and a receiver 104. The transmitter and receiver may be part of an NFC module 106, such as type no. PN5xx manufactured by NXP Semiconductors. The first device 102 may further include an RF front end module 105 and an antenna 107. The second device 104 may include an antenna 108, which is inductively coupled to the antenna 107.

FIG. 2 is an example NFC communication device. The NFC communication device 200 includes an NFC module 202, such as type no. PN5xx manufactured by NXP Semiconductors. NFC module 202 may include a differential transmitter 203 being adapted to generate an electromagnetic carrier signal, to modulate the carrier signal according to data to be transmitted and to drive an antenna circuit 207 with the modulated carrier signal. NFC module 202 may further include a single-ended receiver 204 being adapted to sense response signals being received at antenna circuit 207 and to demodulate the response signals. NFC module 202 has output terminals TX1 and TX2 coupled to respective first and second transmitting paths wherein the first and second transmitting paths are coupled to antenna circuit 207.

The NFC communication device 200 further includes an RF front end module 205 coupled between the NFC module 202 and antenna circuit 207. The RF front end module 205 may include an electromagnetic compatibility (EMC) filter 206 comprising two inductors $L_{EMC}$ and two capacitors $C_{EMC}$ (a dedicated LC coupled to each output terminals TX1 and TX2), a balanced to unbalanced (Balun) transformer 208 for converting differential antenna matching network to single-end antenna matching network, a pair of capacitors $C_{SER}$ and $C_{PAR}$ in the transmitting paths, a decoupling capacitor $C_{RX}$ and a resistor $R_{RX}$ in the receiving path.

Inductively coupled communication systems such as NFC present a number of design challenges. One such design challenge is that the analog front end of NFC communication devices must be capable of accommodating multiple modes of operation (reader/writer, peer-to-peer, and card emulation). Challenges associated with RF front end design may include, but are not limited to the following: interference from transmitter to receiver, impedance matching from transmitter to antenna and antenna to receiver, BOM of components in the front-end (cost per device related to PCB area, manufacturing, testing, etc.), component variation used in the front-end, significant losses in the EMC inductors, crosstalk between the EMC inductors, un-wanted coupling from EMC to other components, to name just a few. As a result of these design challenges associated with producing communication devices of minimal size, weight, complexity, power consumption, and cost there exists a need for an improved RF front end topology in an NFC communication device.

SUMMARY

A device for inductively coupled communications includes an NFC module for generating an electromagnetic carrier signal and modulating the carrier signal according to data to be transmitted, and an antenna circuit coupled to and driven by said NFC module with the modulated carrier signal. The device includes an RF front end coupled between said NFC module and said antenna circuit. The RF front end includes a balanced to unbalanced (Balun) transformer and a tuning capacitor. The Balun transformer has a first winding coupled to said NFC module via differential transmitter terminals of said NFC module and a second winding coupled to said tuning capacitor. A first terminal of said tuning capacitor is coupled to a receiving terminal of said NFC module. The Balun transformer and tuning capacitor provide a function of an electromagnetic compatibility (EMC) filter.

In one example embodiment, said device further comprises an inductor having a first terminal connected to said second winding and a second terminal connected to said tuning capacitor.

In one example embodiment, said NFC module includes a differential transmitter and a single-ended receiver.

In one example embodiment, said antenna circuit is a single-end antenna.

In one example embodiment, said Balun transformer has an equivalent inductance and a coupling factor K, wherein said coupling factor K has a value between 0 and 1.

In one example embodiment, said function of said EMC filter is a low pass filter.

In one example embodiment, said device is incorporated in a mobile device and adapted to be powered by the mobile device.

A device for inductively coupled communications includes an NFC module for generating an electromagnetic carrier signal and modulating the carrier signal according to data to be transmitted, and an antenna circuit coupled to and driven by said NFC module with the modulated carrier signal. The device includes an RF front end coupled between said NFC module and said antenna circuit. The RF front end includes a balanced to unbalanced (Balun) transformer. The Balun transformer has a first winding coupled to said NFC module via differential transmitter terminals of said NFC module. A receiving terminal of said NFC module is coupled to an input terminal of said antenna circuit. The Balun transformer provides a function of an electromagnetic compatibility (EMC) filter.

In one example embodiment, said device further comprises a tuning capacitor coupled to a second winding of said Balun transformer, wherein said Balun transformer and said tuning capacitor are adapted to provide said function of said EMC filter.

In one example embodiment, said device further comprises an inductor having a first terminal connected to said second winding and a second terminal connected to said tuning capacitor.

A device for inductively coupled communications includes an NFC module for generating an electromagnetic carrier signal and modulating the carrier signal according to data to be transmitted, and an antenna circuit coupled to and driven by said NFC module with the modulated carrier signal. The device includes an RF front end coupled between said NFC module and said antenna circuit. The RF front end includes a balanced to unbalanced (Balun) transformer. The Balun transformer has a first winding coupled to said NFC module via differential transmitter terminals of said NFC module and a second winding coupled to a receiving terminal of said NFC module. The Balun transformer provides a function of an electromagnetic compatibility (EMC) filter.

The above discussion is not intended to represent every example embodiment or every implementation within the scope of the current or future Claim sets.

Various example embodiments may be more completely understood in consideration of the following Detailed Description in connection with the accompanying Drawings.

Figure 1:
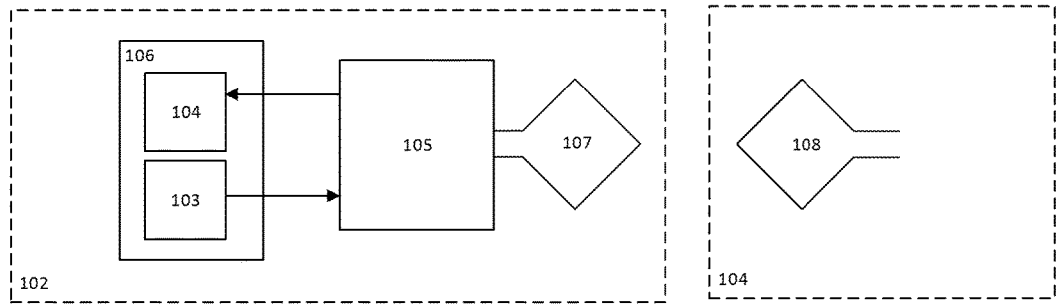
FIG. 1 is an example inductively coupled communication system.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Figure 3:
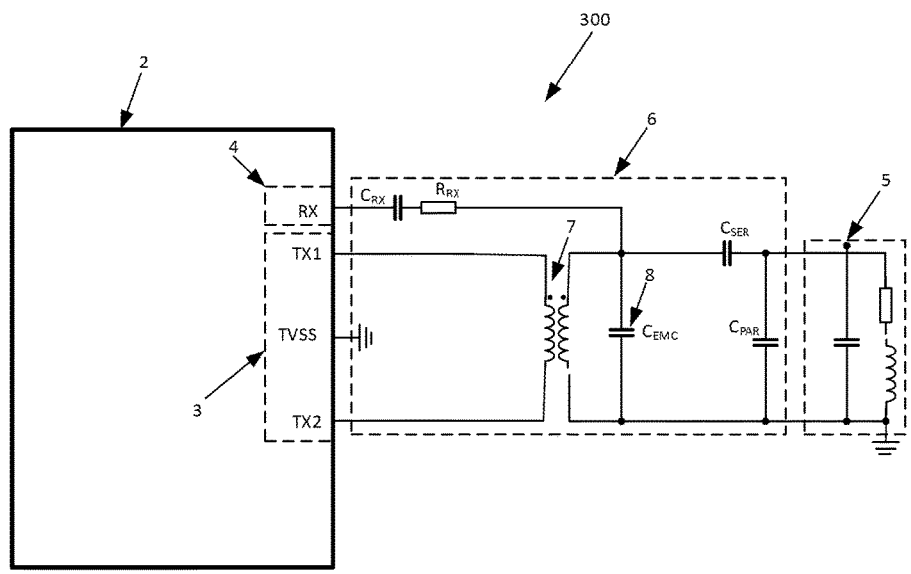
FIG. 3 is a first embodiment of an NFC device.

FIG. 3 is a first embodiment of an NFC device. The NFC device 300 includes an NFC module 2. The NFC module 2 includes a differential transmitter 3 and a single ended receiver 4. Transmitter 3 generates an electromagnetic carrier signal. The carrier signal is modulated according to data to be transmitted. An antenna circuit 5 is driven with the modulated carrier signal. It should be noted that antenna circuit 5 is a single-end antenna. NFC module 2 has output terminals TX1 and TX2 being coupled to first and second transmitting paths wherein the transmitting paths are coupled to the antenna 5.

The NFC device 300 further includes an RF front end module 6 being coupled between the NFC module 2 and antenna circuit 5. The RF front end module 6 may include a balanced to unbalanced (Balun) transformer 7, a parallel capacitor $C_{EMC}$ 8 coupled to the secondary winding of the Balun transformer, a pair of capacitors $C_{SER}$ and $C_{PAR}$ in the transmitting paths, a decoupling capacitor $C_{RX}$ and a resistor $R_{RX}$ in the receiving path.

As depicted in FIG. 3, the receiver 4 has an input terminal RX being coupled to parallel capacitor $C_{EMC}$ 8 via the decoupling capacitor $C_{RX}$ and resistor $R_{RX}$ in the receiving path. Receiver 4 is well known to those skilled in the art, and thus would not be explained in further detail.

Figure 2:
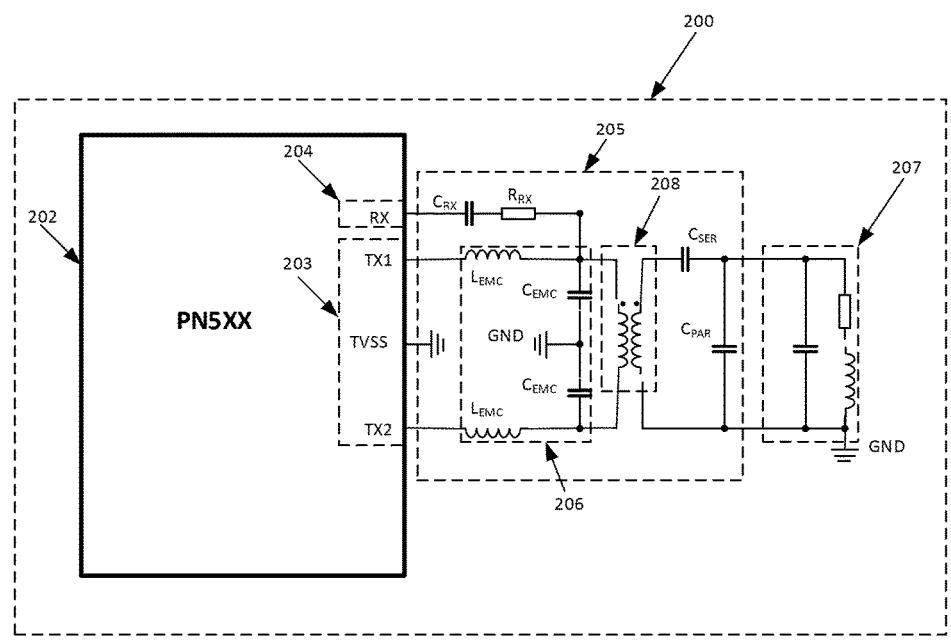
FIG. 2 is an example NFC device.

In this embodiment, instead of using two inductors $L_{EMC}$ and two capacitors $C_{EMC}$ (a dedicated LC coupled to each output terminals TX1 and TX2 as depicted in FIG. 2) to provide the function of an EMC filter, the EMC filtering function is achieved by an equivalent inductance of the Balun transformer 7 and the parallel capacitor $C_{EMC}$ 8. Thus, as compared to the implementation of FIG. 2, this embodiment effectively reduces the number of components used in the RF front end by eliminating at least two inductors ($L_{EMC}$) from the topology, which are considered to be the bulkiest, most expensive, and most lossy components in the RF front end module. The EMC filtering function achieved by this embodiment is an EMC low-pass filter.

Further advantages of this embodiment may include an increase in output power and power efficiency.

Figure 4:
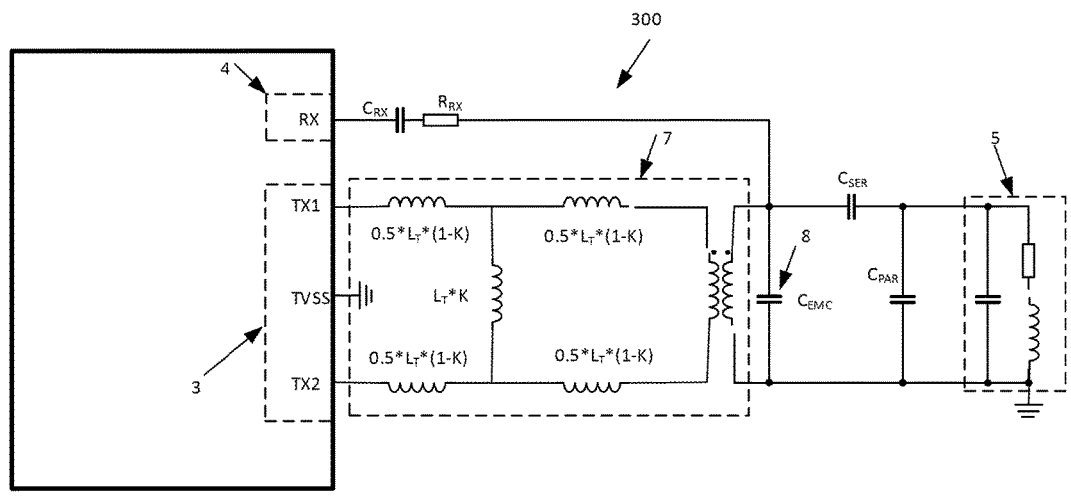
FIG. 4 is an equivalent circuit for the Balun transformer of FIG. 3.

FIG. 4 is an equivalent circuit for the Balun transformer of FIG. 3. In one embodiment, the equivalent inductance provided by the Balun transformer 7 may be calculated according to the configuration shown in FIG. 4, wherein $L_T$ is the inductance of the Balun coils and K is the coupling factor of the Balun transformer having a value between 0 and 1 ($0<K\le 1$). The configuration of FIG. 4 and the inductance calculation are well known to those skilled in the art, and thus would not be explained in further detail.

Figure 5:
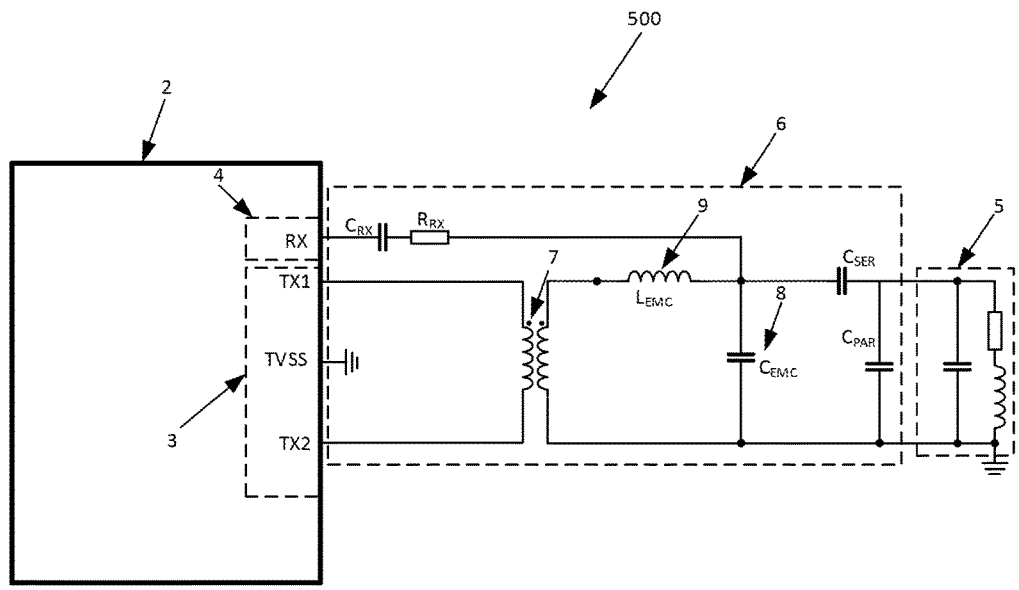
FIG. 5 is a second embodiment of the NFC device.

FIG. 5 is a second embodiment of the NFC device. This second embodiment and the first embodiment of FIG. 3 have much in common. The main difference lies in the implementation of the EMC filtering function as explained below.

Specifically, the RF front end module 6 includes an inductor $L_{EMC}$ 9 having a first terminal connected to said secondary winding of the Balun transformer and a second terminal connected to the parallel capacitor $C_{EMC}$ 8. In this embodiment, the EMC filtering function is achieved by an equivalent inductance of the Balun transformer 7, the parallel capacitor $C_{EMC}$ 8, and the inductor $L_{EMC}$ 9. Thus, as compared to the implementation of FIG. 2, this embodiment effectively reduces the number of components used in the RF front end by eliminating at least one inductor ($L_{EMC}$) from the topology.

Figure 6:
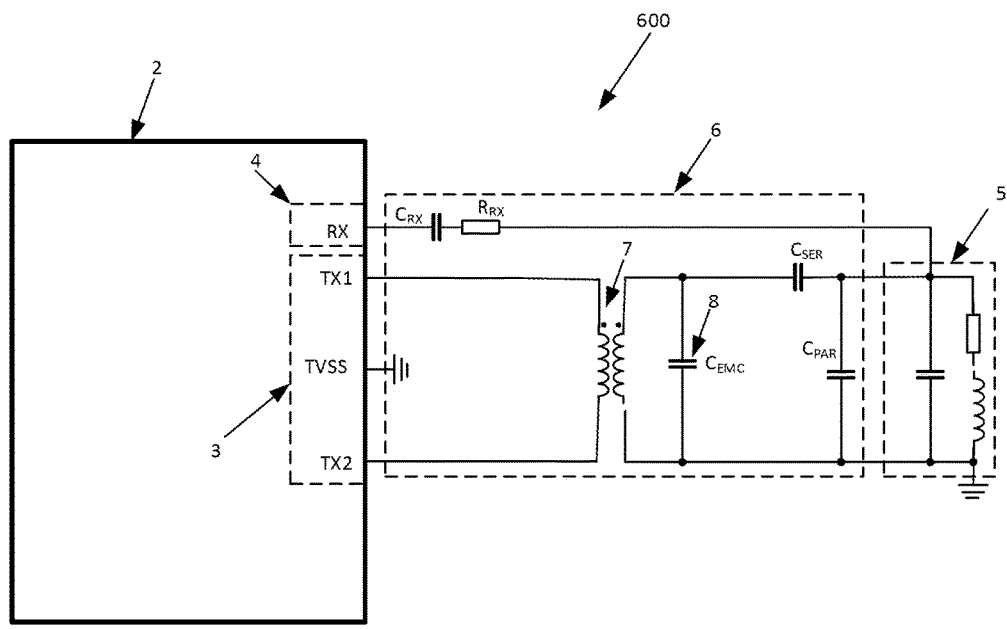
FIG. 6 is a third embodiment of the NFC device.

FIG. 6 is a third embodiment of the NFC device. This third embodiment and the first embodiment of FIG. 3 have much in common. The only difference lies in the input terminal RX of the receiver 4 is being coupled to an input terminal of the antenna circuit 5 via the decoupling capacitor $C_{RX}$ and resistor $R_{RX}$ in the receiving path.

As with the first embodiment, the EMC filtering function is achieved by an equivalent inductance of the Balun transformer 7 and the parallel capacitor $C_{EMC}$ 8. This embodiment effectively reduces the number of components used in the RF front end by eliminating at least two inductors ($L_{EMC}$) from the topology depicted in FIG. 2.

Figure 7:
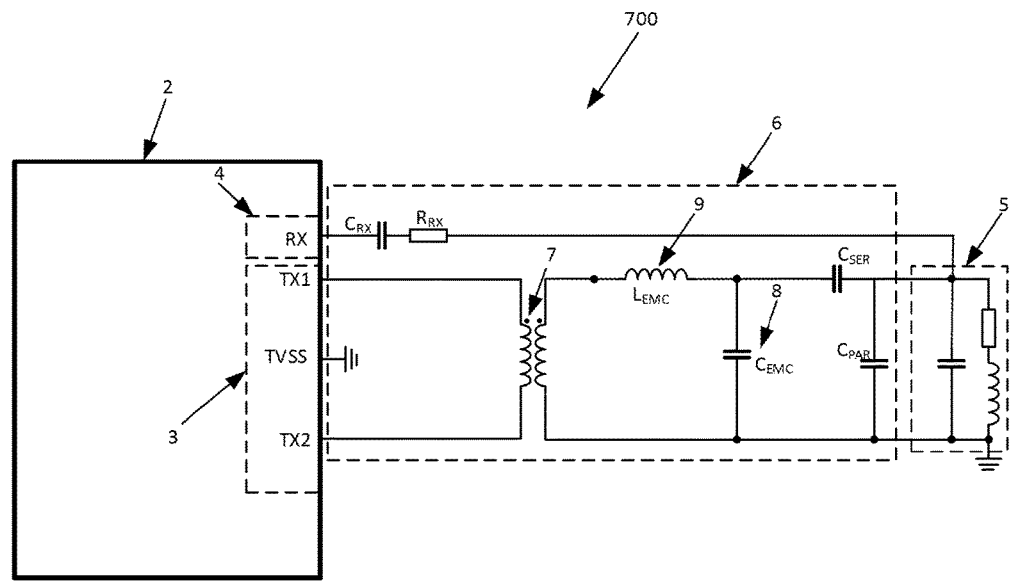
FIG. 7 is a fourth embodiment of the NFC device.

FIG. 7 is a fourth embodiment of the NFC device. This fourth embodiment and the second embodiment of FIG. 5 have much in common. The only difference lies in the input terminal RX of the receiver 4 is being coupled to an input terminal of the antenna circuit 5 via the decoupling capacitor $C_{RX}$ and resistor $R_{RX}$ in the receiving path.

As with the second embodiment, the EMC filtering function is achieved by an equivalent inductance of the Balun transformer 7, the parallel capacitor $C_{EMC}$ 8, and the inductor $L_{EMC}$ 9. This embodiment effectively reduces the number of components used in the RF front end by eliminating at least one inductor ($L_{EMC}$) from the topology of FIG. 2.

Figure 8:
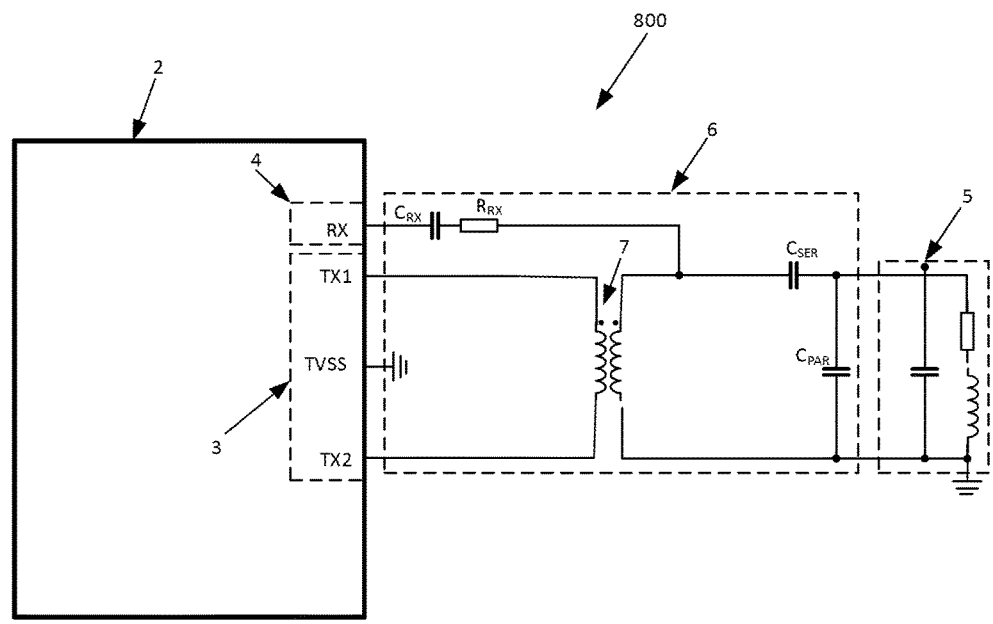
FIG. 8 is a fifth embodiment of the NFC device.

FIG. 8 is a fifth embodiment of the NFC device. This fifth embodiment and the first embodiment of FIG. 3 have much in common. The main difference lies in the implementation of the EMC filtering function as explained below.

In this embodiment, the EMC filtering function is achieved by an equivalent inductance of the Balun transformer 7, without using any additional component such as the parallel capacitor $C_{EMC}$ 8 and/or the inductor $L_{EMC}$ 9. Thus, as compared to the implementation of FIG. 2, this embodiment further reduces the number of components used in the RF front end by eliminating two inductors ($L_{EMC}$) and two capacitors ($C_{EMC}$) from the topology of FIG. 2.

As depicted in FIG. 8, the input terminal RX of the receiver 4 is being coupled to a first end of said secondary winding of the Balun transformer 7 via the decoupling capacitor $C_{RX}$ and resistor $R_{RX}$ in the receiving path.

Figure 9:
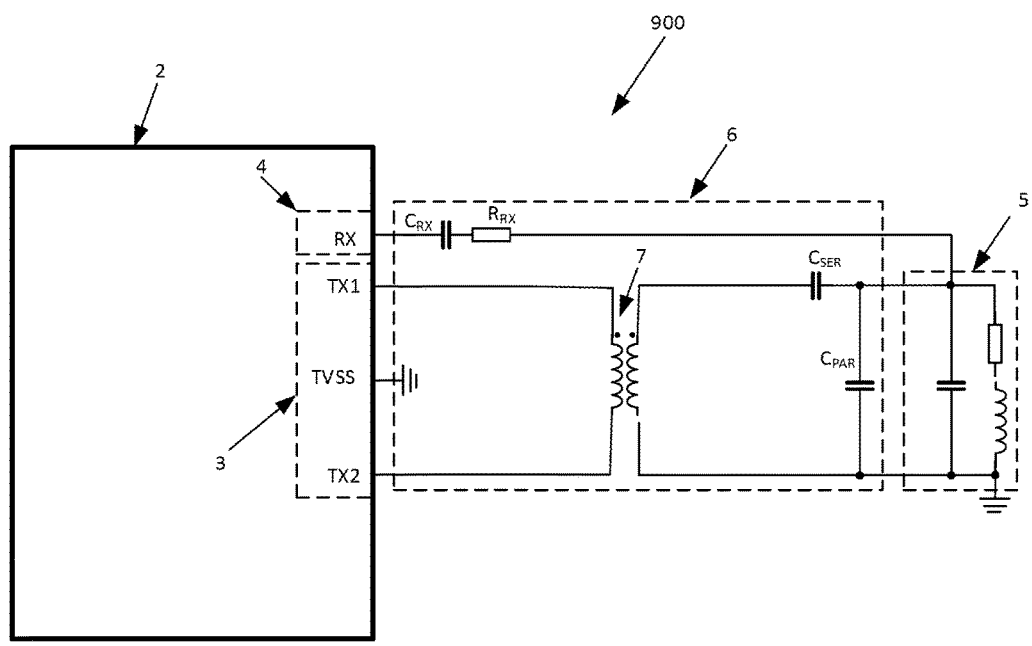
FIG. 9 is a sixth embodiment of the NFC device.

FIG. 9 is a sixth embodiment of the NFC device. This embodiment and the fifth embodiment of FIG. 8 have much in common. The only difference lies in the input terminal RX of the receiver 4 is being coupled to an input terminal of the antenna circuit 5 via the decoupling capacitor $C_{RX}$ and resistor $R_{RX}$ in the receiving path.

As with the fifth embodiment, the EMC filtering function is achieved by the equivalent inductance of the Balun transformer 7, without using any additional component such as the parallel capacitor $C_{EMC}$ 8 and/or the inductor $L_{EMC}$ 9. Thus, as compared to the implementation of FIG. 2, this embodiment further reduces the number of components used in the RF front end by eliminating two inductors ($L_{EMC}$) and two capacitors ($C_{EMC}$) from the topology of FIG. 2.

It should be noted that the above embodiments are applicable to an NFC module having a differential transmitter and a single ended receiver. It should also be noted that the above embodiments are applicable to a single ended antenna configuration.

The NFC device described in the above embodiments may be incorporated into a mobile device, e.g., a mobile phone, and adapted to be powered by the mobile device.

It should be noted that the above-mentioned embodiments illustrate rather than limit the invention, and that those skilled in the art will be able to design many alternative embodiments without departing from the scope of the appended claims. It is intended that the following claims cover all possible example embodiments.

In the claims, any reference signs placed between parentheses shall not be construed as limiting the claim. The word "comprising" does not exclude the presence of elements or steps other than those listed in a claim. The indefinite article "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

What is claimed is:

1. A device for inductively coupled communications comprising:
    a near field communication (NFC) module being adapted to generate an electromagnetic carrier signal and to modulate the carrier signal according to data to be transmitted;
    an antenna circuit coupled to said NFC module and driven by said NFC module with the modulated carrier signal; and
    an RF front end coupled between said NFC module and said antenna circuit;
    said RF front end including a balanced to unbalanced (Balun) transformer and a tuning capacitor;
    said Balun transformer having a first winding coupled to said NFC module via differential transmitter terminals of said NFC module and a second winding coupled to said tuning capacitor;
    a first terminal of said tuning capacitor being coupled to a receiving terminal of said NFC module;
    said Balun transformer and said tuning capacitor being adapted to provide a function of an electromagnetic compatibility (EMC) filter without using an inductor and capacitor network (LC network) coupled between said NFC module and said Balun transformer.

2. The device of claim 1, further comprising an inductor having a first terminal connected to said second winding and a second terminal connected to said tuning capacitor.

3. The device of claim 1, wherein said NFC module includes a differential transmitter and a single-ended receiver.

4. The device of claim 1, wherein said antenna circuit is a single-end antenna.

5. The device of claim 1, wherein said Balun transformer has an equivalent inductance and a coupling factor K, wherein said coupling factor K has a value between 0 and 1.

6. The device of claim 1, wherein said function of said EMC filter is a low pass filter.

7. The device of claim 1, wherein said device is incorporated in a mobile device and adapted to be powered by the mobile device.

8. A device for inductively coupled communications comprising:
    a near field communication (NFC) module being adapted to generate an electromagnetic carrier signal and to modulate the carrier signal according to data to be transmitted;
    an antenna circuit coupled to said NFC module and driven by said NFC module with the modulated carrier signal; and
    an RF front end coupled between said NFC module and said antenna circuit;
    said RF front end including a balanced to unbalanced (Balun) transformer;
    said Balun transformer having a first winding coupled to said NFC module via differential transmitter terminals of said NFC module;
    a receiving terminal of said NFC module being coupled to an input terminal of said antenna circuit;
    said Balun transformer being adapted to provide a function of an electromagnetic compatibility (EMC) filter without using an inductor and capacitor network (LC network) coupled between said NFC module and said Balun transformer.

9. The device of claim 8, further comprising a tuning capacitor coupled to a second winding of said Balun transformer, said Balun transformer and said tuning capacitor being adapted to provide said function of said EMC filter.

10. The device of claim 9, further comprising an inductor having a first terminal connected to said second winding and a second terminal connected to said tuning capacitor.

11. The device of claim 8, wherein said NFC module includes a differential transmitter and a single-ended receiver.

12. The device of claim 8, wherein said antenna circuit is a single-end antenna.

13. The device of claim 8, wherein said Balun transformer has an equivalent inductance and a coupling factor K, wherein said coupling factor K has a value between 0 and 1.

14. The device of claim 8, wherein said function of said EMC filter is a low pass filter.

15. A device for inductively coupled communications comprising:
- a near field communication (NFC) module being adapted to generate an electromagnetic carrier signal and to modulate the carrier signal according to data to be transmitted;
- an antenna circuit coupled to said NFC module and driven by said NFC module with the modulated carrier signal; and
- an RF front end coupled between said NFC module and said antenna circuit;
- said RF front end including a balanced to unbalanced (Balun) transformer;
- said Balun transformer having a first winding coupled to said NFC module via differential transmitter terminals of said NFC module and a second winding coupled to a receiving terminal of said NFC module;
- said Balun transformer being adapted to provide a function of an electromagnetic compatibility (EMC) filter without using an inductor and capacitor network (LC network) coupled between said NFC module and said Balun transformer.

16. The device of claim 15, wherein said NFC module includes a differential transmitter and a single-ended receiver.

17. The device of claim 15, wherein said antenna circuit is a single-end antenna.

18. The device of claim 15, wherein said Balun transformer has an equivalent inductance and a coupling factor K, wherein said coupling factor K has a value between 0 and 1.

19. The device of claim 15, wherein said function of said EMC filter is a low pass filter.

20. The device of claim 1, wherein said NFC module includes a differential transmitter having a first terminal and a second terminal, wherein said first winding of said Balun transformer is connected to both said first and second terminals of said differential transmitter.

* * * * *